United States Patent [19]
Aronoff et al.

[11] 3,839,261
[45] Oct. 1, 1974

[54] ESTERS OF PHENYLINDAN USED AS PLASTICIZERS AND CROSSLINKING AGENTS

[75] Inventors: Elihu J. Aronoff, Framingham; Kewal Singh Dhami, Shrewsbury, both of Mass.

[73] Assignee: International Telephone and Telegraph Corporation, New York, N.Y.

[22] Filed: June 22, 1973

[21] Appl. No.: 372,834

[52] U.S. Cl.... 260/31.8 F, 260/31.2 R, 260/31.8 R, 260/31.8
[51] Int. Cl. .................. C08f 45/36, C08g 51/34
[58] Field of Search .... 260/475 R, 31.8 F, 78.5 BB, 260/87.5 A, 31.2 R

[56] References Cited
UNITED STATES PATENTS
2,780,609   2/1957   Petropoulos ................. 260/475 FR

*Primary Examiner*—Allan Lieberman
*Assistant Examiner*—Richard Zaitlen
*Attorney, Agent, or Firm*—J. B. Raden; M. M. Chaban

[57] ABSTRACT

The dicarboxyallyl, dicarboxymethallyl and mixed carboxyallyl — carboxymethallyl esters of phenyl indan are novel compositions of matter. These compounds are useful as crosslinking and plasticizing agents for polymeric compositions.

8 Claims, No Drawings

ESTERS OF PHENYLINDAN USED AS PLASTICIZERS AND CROSSLINKING AGENTS

This is a division of application Ser. No. 243,052 now U.S. Pat. No. 3,763,222.

This invention relates to novel esters of phenyl indan having the structural formula:

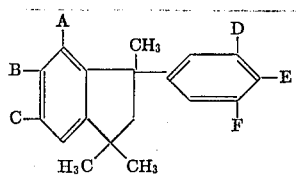

wherein A, B, C, D, E and F are selected from the group consisting of hydrogen, carboxyallyl and carboxymethallyl radicals; and wherein one of A, B and C and one of D, E and F is a carboxyallyl or a carboxymethallyl radical.

As illustrative of particularly preferred compounds of this invention are those having the structural formula:

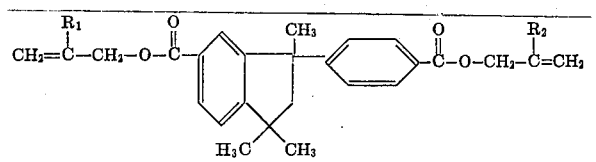

wherein $R_1$ and $R_2$ are independently selected from the group consisting of hydrogen and methyl radicals.

We have found that these compounds possess excellent properties as plasticizing and as crosslinking agents for a variety of polymeric compositions and particularly for high temperature processing fluorocarbon homopolymers and copolymers such as ethylene-tetrafluoroethylene copolymers, ethylene-chlorotrifluoroethylene copolymers, polyvinylidene fluoride homopolymers, tetrafluoroethylene-vinylidene fluoride copolymers, tetrafluoroethylenehexafluoropropylene copolymers, vinylidene flouride-hexafluoropropylene copolymers, vinylidene fluoride-hexafluoropropylene-tetrafluoroethylene copolymers and the like. The new compounds have been found to be particularly useful as crosslinking coreactants which assist in providing elevated temperature deformation resistance in the crosslinked product. The compounds also exhibit very useful plasticizing properties during processing of the polymeric compositions.

Our new compounds can be produced by reacting a precursor phenyl indan dicarboxylic acid such as a 1,1,-3-trimethyl-5-carboxy-3-(p-carboxyphenyl) indan diacid with thionyl chloride to produce the corresponding diacyl chloride and reacting this diacyl chloride with allyl alcohol, methallyl alcohol or a mixture of allyl and methallyl alcohol. The precursor diacid starting materials are already known and are produced from a suitable tetramethyl-3-tolyl indan by a catalytic air oxidation process similar to that described in an article by P. Towle and H. Baldwin in *Hydrocarbon Processing* 43 (11) 149 (1964).

Alternatively, these new compounds can be prepared by other methods including direct esterification, catalyzed esterification or interchange esterification from saturated esters. Additionally, the compounds can be produced from a phenyl indan dinitrile or dialdehyde or like intermediates by known techniques.

As illustrative of the preparation of the compounds of this invention are the following:

EXAMPLE I

To a suitable reaction vessel equipped with a thermometer and reflux condenser was charged 80 grams (0.19 mole) of 1,1,3-trimethyl-5-carboxy-3-(p-carboxyphenyl) indan and 74 grams (0.62 mole) of thionyl chloride. The so charged mass was heated carefully until solution occurred and then refluxed overnight. Excess thionyl chloride was distilled, first at atmospheric pressure and finally at the aspirator. Then, 66 grams (1.14 moles) of allyl alcohol were added and the reaction mixture was heated overnight under reflux. Most of the excess allyl alcohol was stripped and the residual molten mass slurried several times with dilute sodium carbonate solution and finally with water. After collection and air drying on a Buchner funnel, the resulting powdered cake was oven dried for one hour at 100° C to obtain 73 grams (58 percent of the theoretical) of a buff colored powder melting at 82°-84° C. The resulting product was then recrystallized from ethanol to yield a lighter buff colored product which was characterized by infrared spectroscopy as the diallyl ester of 1,1,3trimethyl- 5-carboxy-3(p-carboxyphenyl) indan, M.P. 84° C(at a 5° C/minute differential scanning calorimeter rate).

EXAMPLE II

Employing the procedure of Example I, 50 grams (0.155 mole) of 1,1,3-trimethyl-5-carboxy-3-(p-carboxyphenyl) indan and 50 ml. (0.68 mole) of thionyl chloride were refluxed with exclusion of atmospheric moisture for 8 hours. Excess thionyl chloride was removed at atmospheric pressure and finally under aspirator vacuum. Thirty-five ml. (0.71 mole) of methallyl alcohol were added to the resulting diacyl chloride and after reflux for 2 hours the mixture was poured into water and subsequently washed successively with dilute aqueous sodium carbonate and water. The mixture was then distilled under reduced pressure and 40 grams of a deep strap colored product were collected at 245°-6° C/0.7 Torr. The product was cooled to produce a viscous liquid which was not readily crystallizable. The product was characterized by infrared spectroscopy as the dimethallyl ester of 1,1,3-trimethyl-5-carboxy-3-(p-carboxyphenyl) indan.

EXAMPLE III

Employing the procedure of Example I, 50 grams of 1,1,3-trimethyl-5-carboxy-3-(p-carboxyphenyl) indan and 50 grams of thionyl chloride were reacted and the resulting reaction product was treated with a mixture of 24 grams (0.35 mole) of methallyl alcohol and 20 grams (0.35 mole) of allyl alcohol. Isolation by the method of Example II, yielded 38 grams (58.5% yield) of a straw colored liquid which boiled at 238°-45° C/0.7 Torr.

Examination of the resulting product in carbon tetrachloride solution by nuclear magnetic resonance spectroscopy showed the presence of essentially equimolar quantities of allylic and methallylic groups indicating that the product was a mixed allyl-methallyl diester of 1,1,3-trimethyl-5-carboxy-3-(p-carboxyphenyl)indan.

The compounds of this invention have been found to possess particularly useful characteristics as additives to accelerate the crosslinking of polymers by chemical or irradiation activation. Thermal testing has shown that these compounds have very excellent thermal stability and very low volatility when compared with the acrylic, methacrylic and allylic compounds employed heretofore as crosslinking accelerators. Furthermore, the present compounds possess solubility or plasticizing properties which render them compatible with a variety of polymeric systems. For example, ethylenetetrafluoroethylene copolymers and ethylene-chlorotriflöroethylene copolymers are known to exhibit unusually high chemical resistance and tend to reject plasticizer or solvent which is incorporated therein. However, we have discovered that the esters of the present invention are quite compatible with these fluorinated copolymers which is surprising in view of previously reported data indicating that these copolymers have high resistance to solvation and swelling. In fact, we have found that by incorporation, for example, the diallyl esters of the present invention into these copolymers, extrusion thereof is achieved at considerably lower temperature profiles. In accordance with this finding, the following table is set forth to illustrate the decrease in torque achieved by the incorporating of the diallyl ester of 1,1,3-trimethyl-5-carboxy-3-(p-carboxyphenyl) indan into various polymeric compositions as compared with torque values achieved with no additive or with the addition of a standard prior art crosslinking coreactant compound (i.e., triallyl cyanurate) in the polymeric compositions:

peratures, for example, to provide continuous thin wall extrusions or at equivalent temperatures can provide substantially thinner walled extrusions as compared with compositions containing the prior art trially cyanurate crosslinkers.

As illustrative of the excellent mechanical and aging properties possessed by crosslinked polymeric compositions containing the compounds of the present invention, are the following:

EXAMPLE IV

A polymeric composition was prepared by powder blending an ethylene-chlorotrifluoroethylene copolymer with 3% (by weight) of a diallyl ester of 1,1,3-trimethyl-5-carboxy-3-(p-carboxyphenyl) indan produced by the process of Example I and 1% (by weight) magnesium oxide. The blended mixture was then compression molded at 490° F and subjected to irradiation at a 10 megarad dose in a 1.5 MEV electron beam accelerator to produce a crosslinked polymeric composition having the following mechanical properties at room temperature (about 25° C) and at elevated temperature (250° C):

At 25° C
Tensile Strength  6387 psi
Elongation (at 10"/minute stretch)  250 %

At 250° C
Tensile Strength  339 psi
Elongation (at 10"/minute stretch)  263 %
Hot Modulus *  43 %

TABLE I

| POLYMERIC COMPOSITION | MONOMER INCORPORATED IN THE POLYMERIC COMPOSITION | WEIGHT OF MONOMER (%) | MIXING CHAMBER TEMPERATURE (°F) | *TORQUE (METER-GRAMS) |
|---|---|---|---|---|
| Ethylene-tetrafluoro-ethylene copolymer | None | — | 580 | 900 |
| do. | Diallyl ester of 1,1,3-trimethyl-3-(p-5 carboxyphenyl) indan | 5 | 580 | 800 |
| do. | Triallyl cyanurate | 5 | 580 | 1100 |
| Ethylene-chlorotri-fluoroethylene co-polymers | None | — | 500 | 1660 |
| do. | Diallyl ester of 1,1,3-trimethyl-3-(p-5 carboxyphenyl) indan | 5 | 500 | 1450 |
| do. | Triallyl cyanurate | 5 | 500 | 1660 |
| Polyvinylidene fluoride homopolymer | None | — | 550 | 1950 |
| do. | Diallyl ester of 1,1,3-trimethyl-3-(p-5 carboxyphenyl) indan | 5 | 550 | 1650 |
| do. | Triallyl cyanurate | 5 | 550 | 1950 |

*These experiments were conducted in a "Brabender" sigma type mixer using a 70 gram total charge in each case employing the noted temperatures at a shear rate of 80 rpm.

It should be noted from the tabulated data that due to the compatability of the diallyl ester of the present invention in the polymeric compositions, a substantial decrease in torque is exhibited whereas the non-compatible prior art triallyl cyanurate additive does not provide this effect.

This reduction in torque values indicates that the polymeric compositions containing the diallyl ester of the present invention can be processed at lower tem-

* The hot modulus test indicates the percentage extension of a sample strip of crosslinked polymer after heating the polymeric composition above the melting temperature of the uncrosslinked polymeric composition, and applying a 50 psi stress to the crosslinked composition while it is above this melting temperature and subsequently cooling of the composition to room temperature.

EXAMPLE V

A sample of the irradiation crosslinked composition of Example IV and a control sample of ethylene-chlorotrifluoroethylene copolymer (containing no additive) which was also subjected to irradiation at a 10 megarad dose were aged at 200° C and tested for tensile strength and elongation after cooling to room temperature (about 25°C.). The results of this testing demonstrating the superior aging qualities possessed by polymeric composition containing a diallyl ester of the present invention were as follows:

Additionally, the irradiation crosslinked compositions were tested for aging characteristics by the procedure of Example V. The results of this testing were as follows:

TABLE IV

| IRRADIATION DOSAGE (MEGARADS) | TEST | AGING PERIOD (DAYS) | | | | |
|---|---|---|---|---|---|---|
| | | 1 | 3 | 5 | 7 | 15 |
| 5 | Tensile Strength (psi) | 909 | 931 | 878 | 693 | 521 |
| 10 | do. | 762 | 714 | 614 | 654 | 534 |
| 5 | Elongation (% at 10 inches per minute stretch) | 450 | 438 | 425 | 425 | 431 |
| 10 | do. | 369 | 350 | 325 | 325 | 390 |

To show the effectiveness of crosslinked polymeric compositions containing a plasticizing and crosslinking

TABLE II

| MONOMER INCORPORATED INTO ETHYLENE-CHLOROTRIFLUOROETHYLENE COPOLYMER | IRRADIATION DOSAGE (MEGARADS) | TEST | AGING PERIOD (HRS.) | | | |
|---|---|---|---|---|---|---|
| | | | 0 | 24 | 72 | 168 |
| None | 10 | Tensile Strength (psi) | 6351 | 5305 | 4515 | 4163 |
| Diallyl ester of 1,1,3-trimethyl-5-carboxy-3-(p-carboxyphenyl) indan | 10 | do. | 6387 | 5447 | 5494 | 5593 |
| None | 10 | Elongation at 10 inches per minute stretch (%) | 350 | 342 | 396 | 329 |
| Diallyl ester of 1,1,3-trimethyl-5-carboxy-3-(p-carboxyphenyl) indan | 10 | do. | 250 | 242 | 233 | 221 |

EXAMPLE VI

A polymeric composition was prepared by sheeting out a vinylidene fluoridehexafluoropropylene copolymer on a two-roll unheated mill and milling 4% (by weight) of a diallyl ester of 1,1,3-trimethyl-5-carboxy-3-(p-carboxyphenyl) indan and 1% (by weight) magnesium oxide into the copolymer. The sheet was removed from the mill and sliced into small sections. The resulting sections were compression molded at 475° F between Ferrotype plates with a 6 square inch shim cavity therein to produce several 35 mil slabs. These slabs were irradiated at 5 and 10 megarads doses in a 1.5 MEV electron beam accelerator to produce crosslinked polymeric compositions having the following mechanical properties at room temperature (about 25° C) and at elevated temperature (250° C):

agent of the present invention for use as insulations for wires, the following example is set forth:

EXAMPLE VII

A sample comprising pure ethylene-tetrafluoroethylene copolymer and two additional samples comprising ethylene-tetrafluoroethylene copolymer and 3.5 percent (by weight) and 5.0 percent (by weight), respectively, of diallyl 1,1,3-trimethyl-5-carboxy-3-(p-carboxyphenyl) indan were prepared by a powder blending process similar to that shown in Example IV. The resulting three sample compositions in powdered form, were then extruded through an extruder having a head temperature of 530° F. to form rods. The rods were then pelletized and the pellets were extruded onto

TABLE III

| DOSE (MEGARADS) | TEMP. (°C) | TENSILE STRENGTH (psi) | ELONGATION (% AT 10"/MINUTE STRETCH) | HOT MODULUS (% AT 250° C, 50 (psi) |
|---|---|---|---|---|
| 5 | 25 | 374 | 388 | — |
| 5 | 200 | 87 | 95 | 130 |
| 10 | 25 | 930 | 292 | — |
| 10 | 200 | 76 | 74 | 72 | the surface of a 20 gauge tin coated copper wire. The extrusion conditions for the wire insulation were as follows:

| MONOMER INCORPORATED INTO ETHYLENE-TETRAFLUOROETHYLENE COPOLYMER | WEIGHT (%) | TEMPERATURES (°F) | | | | |
|---|---|---|---|---|---|---|
| | | BARREL ZONES | | | DIE | HEAD |
| | | 1 | 2 | 3 | | |
| None | — | 580 | 600 | 600 | 670 | 710 |
| Diallyl ester of 1,1,3-trimethyl--5-carboxy-3-(p-carboxyphenyl) indan | 3.5 | 560 | 560 | 560 | 600 | 650 |
| do. | 5.0 | 540 | 540 | 540 | 580 | 630 |

The three insulated wires were then subjected to irradiation with high energy electrons by a 1.0 MEV resonant beam transformer. The resulting insulated wires with irradiation crosslinked coatings were then annealed and subsequently tested to determine their mechanical and electrical properties. The results of this testing are set forth in the following table:

| TESTS | ETHYLENE-TETRAFLOUROETHYLENE WITH 3.5% (BY WEIGHT) DIALLYL ESTER | | ETHYLENE-TETRAFLUOROETHYLENE WITH 5.0% (BY WEIGHT) DIALLYLESTER | | ETHYLENE-TETRAFLUOROETHYLENE (NO ADDITIVES) | |
|---|---|---|---|---|---|---|
| | 10 Megarad Dose | 15 Megarad Dose | 10 Megarad Dose | 15 Megarad Dose | 10 Megarad Dose | 15 Megarad Dose |
| Insulation Weight (lbs/1000ft.) | 3.0 | 2.9 | 3.0 | 2.98 | 3.0 | 3.0 |
| Tensile Strength (psi room temp.) | 7832 | 6711 | 6198 | 6287 | 5229 | 5562 |
| Elongation (room temp.) (at 10"/minute stretch) | 158 | 108 | 100 | 100 | 133 | 200 |
| Solder Iron (seconds) | 300 + | 300 + | 300 + | 300 + | 26.6 | 300 + |
| Mandrel Deformation (96 hrs., 250° C., 2.5 lbs. load) | Pass | Pass | Pass | Pass | Refused Voltage Failed | Refused Voltage Failed |
| Tensile Strength (psi of 275° C.) | 109 | 117 | 104 | 108 | 27 | 50 |
| Elongation (at 275° C.) | 244 | 124 | 95 | 79 | 375 | 30 + |
| Hot Modulus (275° C., 50 psi) | 48 | 45 | 45 | 34 | Failed | 295 |

Obviously, many modifications and variations of the invention as hereinbefore set forth may be made without departing from the spirit and scope thereof, therefore, only such limitations should be imposed as are indicated in the appended claims.

We claim:

1. A polymeric composition having incorporated therein a plasticizing and crosslinking agent comprising an ester of phenyl indan having the structural formula:

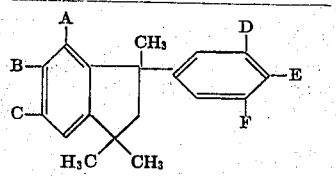

wherein A, B, C, D, E and F are selected from the group consisting of hydrogen, carboxyallyl, and carboxymethallyl radicals; and wherein one of A, B and C and one of D, E and F is a carboxyallyl or a carboxymethallyl radical.

2. The polymeric composition of claim 1 wherein the plasticizing and crosslinking agent is selected from the group consisting of the diallyl ester of 1,1,3-trimethyl-5-carboxy-3-(p-carboxyphenyl) indan, diamethallyl ester of 1,1,3-trimethyl-5-carboxy-3-(p-carboxyphenyl) indan, and mixtures thereof.

3. The polymeric composition of claim 6 wherein said composition contains a high temperature processing fluorocarbon homopolymer or copolymer.

4. The polymeric composition of claim 3 wherein said fluorocarbon homopolymer or copolymer is selected from the group consisting of ethylene-tetrafluoroethylene copolymers, ethylene-chlorotrifluoroethylene copolymers, polyvinylidene fluoride homopolymers, tetrafluoroethylene-vinylidene fluoride copolymers, tetrafluoroethylene-hexafluoropropylene copolymers, vinylidene fluoride-hexafluoropropylene copolymers, and vinylidene fluoridehexafluoropropylene-tetrafluoropropylene copolymers.

5. A crosslinkded polymeric composition containing an ester of phenyl indan having the structural formula:

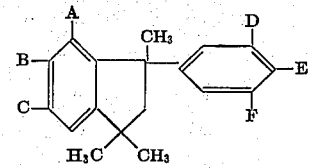

wherein A, B, C, D, E and F are selected from the group consisting of hydrogen, carboxyallyl, and carboxymethallyl radicals; and wherein one of A, B and C and one of D, E and F is a carboxyallyl or a carboxymethallyl radical.

6. The crosslinked polymeric composition of claim 5 wherein said ester of phenyl consisting of the diallyl ester of 1,1,3-trimethyl-5-carboxy-3-(p-carboxyphenyl) indan, dimethallyl ester of 1,1,3-trimethyl-5-carboxy-3-(p-carboxyphenyl) indan mixed allylmethallyl diester of 1,1,3-trimethyl-5-carboxy-3-(p-carboxyphenyl) indan and mixtures thereof.

7. The crosslinked polymeric composition of claim 5 wherein said composition contains a high temperature processing fluorocarbon homopolymer or copolymer.

8. The crosslinked polymeric composition of claim 7 wherein said fluorocarbon homopolymer or copolymer is selected from the group consisting of ethylene-tetrafluoroethylene copolymers, ethylene-chlorotrifluoroethylene copolymers, polyvinylidene fluoride homopolymers, tetrafluoroethylene-vinylidene fluoride copolymers, tetrafluoroethylenehexafluoropropylene copolymers and vinylidene fluoride-hexafluoropropylene copolymers, and vinylidene fluoride-hexafluoropropylene-tetrafluoropropylene copolymers.

* * * * *